(12) United States Patent
Elliott (10) Patent No.: US 11,068,012 B2
(45) Date of Patent: Jul. 20, 2021

(54) RUDDER CONTROL PEDAL ASSEMBLY WITH LINEAR PEDAL TRAVEL PATH

(71) Applicant: The Boeing Company, Chicago, IL (US)

(72) Inventor: Joseph E. Elliott, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 16/527,655

(22) Filed: Jul. 31, 2019

(65) Prior Publication Data

US 2019/0384345 A1 Dec. 19, 2019

Related U.S. Application Data

(62) Division of application No. 15/061,423, filed on Mar. 4, 2016, now Pat. No. 10,409,315.

(51) Int. Cl.
*G05G 1/44* (2008.04)
*B64C 13/04* (2006.01)

(52) U.S. Cl.
CPC ............. *G05G 1/44* (2013.01); *B64C 13/044* (2018.01)

(58) Field of Classification Search
CPC .................................. G05G 1/44; B64C 13/044
See application file for complete search history.

(56) References Cited

U.S. PATENT DOCUMENTS 2,478,882 A 8/1949 Wells
10,409,315 B2 * 9/2019 Elliott ...................... G05G 1/44

* cited by examiner

*Primary Examiner* — Justin M Benedik
(74) *Attorney, Agent, or Firm* — Walters & Wasylyna LLC (57) ABSTRACT

A rudder control pedal assembly including an idler link pivotably coupled to a support frame at a first joint, a coupler link pivotably coupled to the idler link at a second joint, a drive link pivotably coupled to the coupler link at a third joint and pivotably coupled to the support frame at a fourth joint, and a pedal coupled to the coupler link and constrained to movement along an approximately linear travel path, wherein the support frame forms an imaginary fixed link to complete a four-bar linkage.

20 Claims, 9 Drawing Sheets

RUDDER CONTROL PEDAL ASSEMBLY WITH LINEAR PEDAL TRAVEL PATH

PRIORITY

This application is a divisional of U.S. Ser. No. 15/061,423 filed on Mar. 4, 2016.

FIELD

This application relates to rudder control and, more particularly, to rudder control pedal assemblies.

BACKGROUND

Modern aircraft include various flight control surfaces that allow a pilot to adjust and control the aircraft's flight attitude. Control surfaces are movably connected to the aircraft. For example, the empennage of an aircraft typically includes a vertical stabilizer and a rudder moveable (side-to-side movement) relative to the vertical stabilizer. Actuation and resulting motion of the rudder causes a corresponding yaw motion of the aircraft that readjusts the aircraft's flight attitude.

Rudder actuation is typically effected by a pair of pedals positioned at the pilot's feet. The pedals are interconnected such that when one pedal is pushed away from the pilot, the other pedal concomitantly moves toward the pilot. The direction of rudder movement depends on which pedal is being pushed.

Traditionally, rudder control pedals are pivotally connected to the aircraft at pivot points located above or below the pilot interface. Therefore, when displaced, the pedals travel through an arcuate path that is dictated, at least in part, by the distance between the pedals and the pivot points. Such arcuate pedal travel paths can be ergonomically awkward, particularly for pilots of relatively tall stature and pilots of relatively short stature. Existing attempts to provide a linear pedal travel path have various drawbacks, such as use of mechanically unreliable sliding mechanisms and excessively large/complex assemblies.

Accordingly, those skilled in the art continue with research and development efforts in the field of rudder control.

SUMMARY

In one example, the disclosed rudder control apparatus may include a laterally spaced apart pair of pedal assemblies each coupled to a support frame and a rudder control device, the pedal assemblies each including a four-bar linkage constrained to movement in an approximately vertical plane, and a pedal coupled to the four-bar linkage and constrained to movement in an approximately horizontal plane.

In one example, the disclosed rudder control pedal assembly may include an idler link pivotably coupled to a support frame at a first joint, a coupler link pivotably coupled to the idler link at a second joint, a drive link pivotably coupled to the coupler link at a third joint and pivotably coupled to the support frame at a fourth joint, and a pedal coupled to the coupler link and constrained to movement along an approximately linear travel path, wherein the support frame forms an imaginary fixed link to complete a four-bar linkage.

In one example, the disclosed aircraft may include an airframe including a support frame and rudder for control of yaw motion, a rudder control device operatively coupled to the rudder for control of side-to-side motion of the rudder, and a laterally spaced apart pair of pedal assemblies each coupled to the support frame and the rudder control device, the pedal assemblies each including a four-bar linkage constrained to movement in an approximately vertical plane, and a pedal coupled to the four-bar linkage and constrained to movement in an approximately horizontal plane.

Other examples of the disclosed rudder control apparatus and rudder control pedal assembly with linear pedal travel path will become apparent from the following detailed description, the accompanying drawings and the appended claims.

DETAILED DESCRIPTION

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according the present disclosure are provided below.

Figure 1:
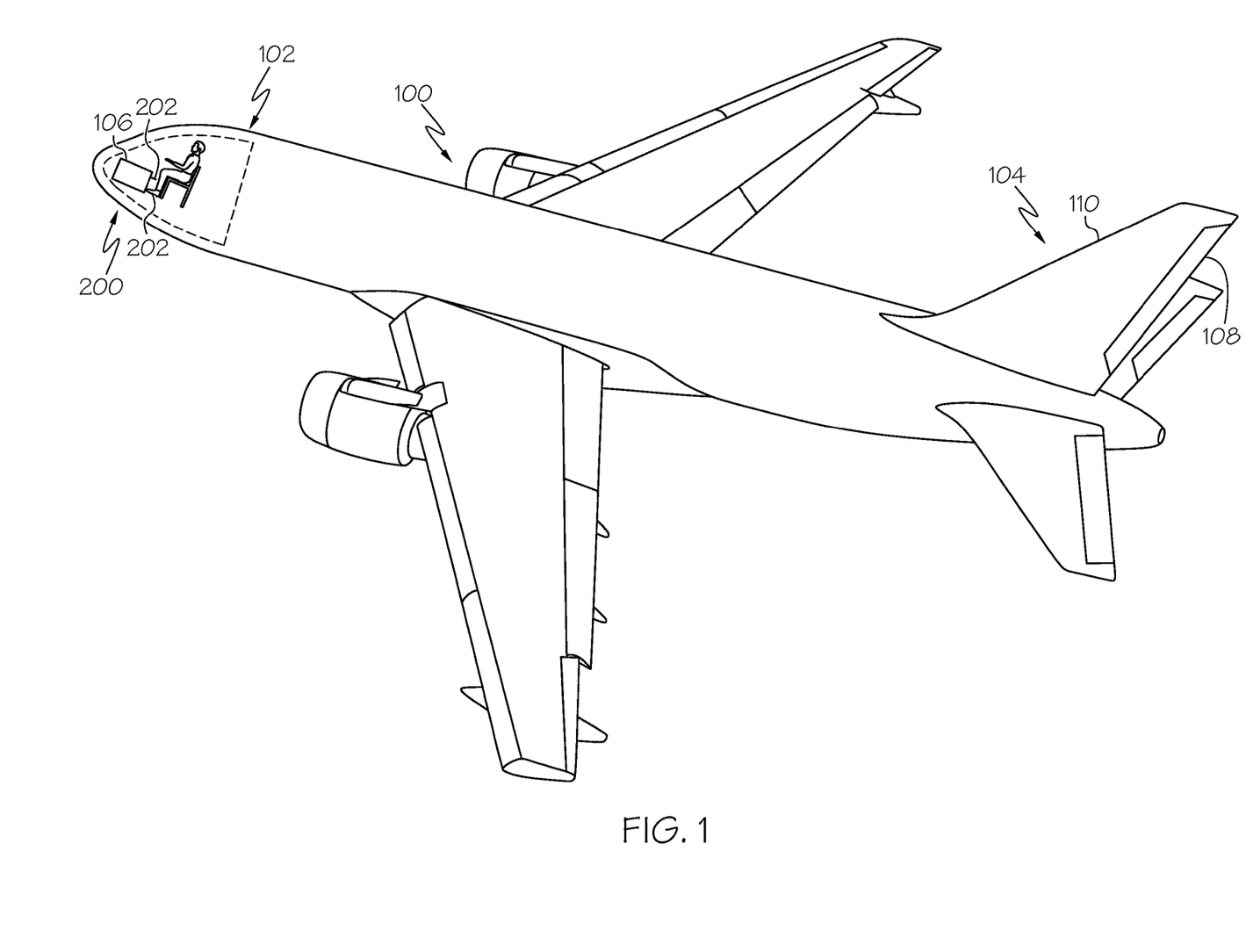
FIG. 1 is a schematic isometric view of one example of an aircraft incorporating the disclosed rudder control apparatus.

Referring to FIG. 1, which illustrates one example of aircraft 100 incorporating the disclosed rudder control apparatus 200. Aircraft 100 may include a forward cockpit 102 (e.g., pilot station) and tail assembly 104. Tail assembly 104 may include vertical stabilizer 110 and rudder 108 movably (e.g., pivotably) coupled to vertical stabilizer 110. Rudder control apparatus 200 is located within cockpit 102 at a position suitable for access and operation by the feet of a pilot. Rudder control apparatus 200 includes two pedal assemblies 202 operatively coupled to rudder control device 106. Rudder control device 106 is operatively coupled to and controls movement (e.g., side-to-side movement) of rudder 108 to correspondingly cause yaw motion of aircraft 100.

As one example, rudder control device 106 may include a mechanical actuation mechanism mechanically (e.g., directly) coupled to rudder 108. For example, actuation of the rudder control device 106 by rudder control apparatus 200 (e.g., forward and aft motion of pedal assemblies 202) would physically cause movement of rudder 108. Movement of rudder 108 may be directly proportional to the displacement of pedal assemblies 202. As another example, rudder control device 106 may include an electronic actuation mechanism electrically coupled to rudder actuators (e.g., by electric wires) coupled to rudder 108. For example, rudder control device 106 may include one or more sensors capable of detecting forward and aft motion of pedal assemblies 202 and a processor capable of generating and transmitting control (e.g., electrical) signals in response to motion of pedal assemblies 202. The strength of the control signal may be directly proportional to the displacement of pedal assemblies, which in turn control movement of rudder 108.

Figure 2:
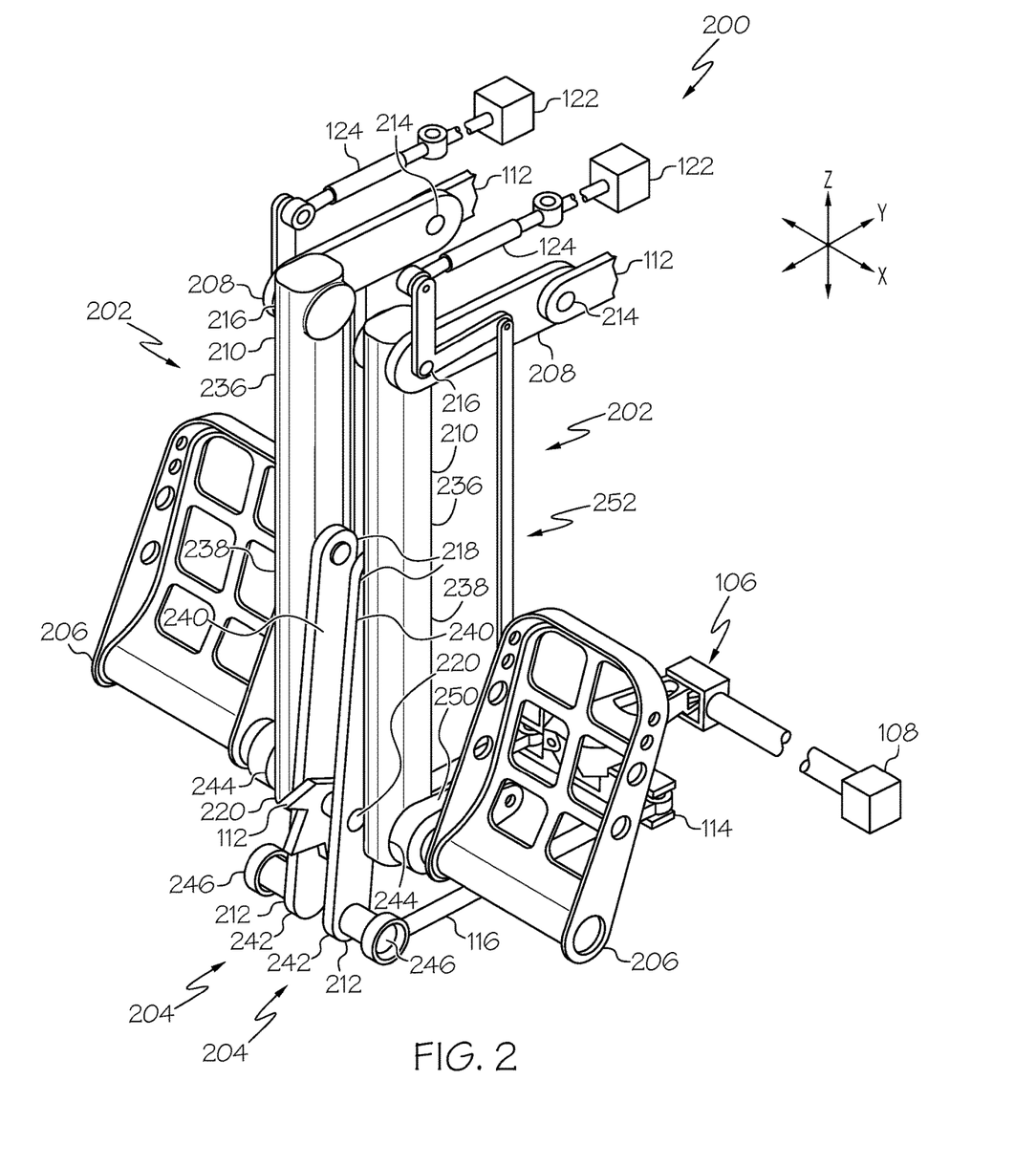
FIG. 2 is a schematic isometric view of one example of the disclosed rudder control apparatus with pedal assemblies in a neutral position.
Figure 3:
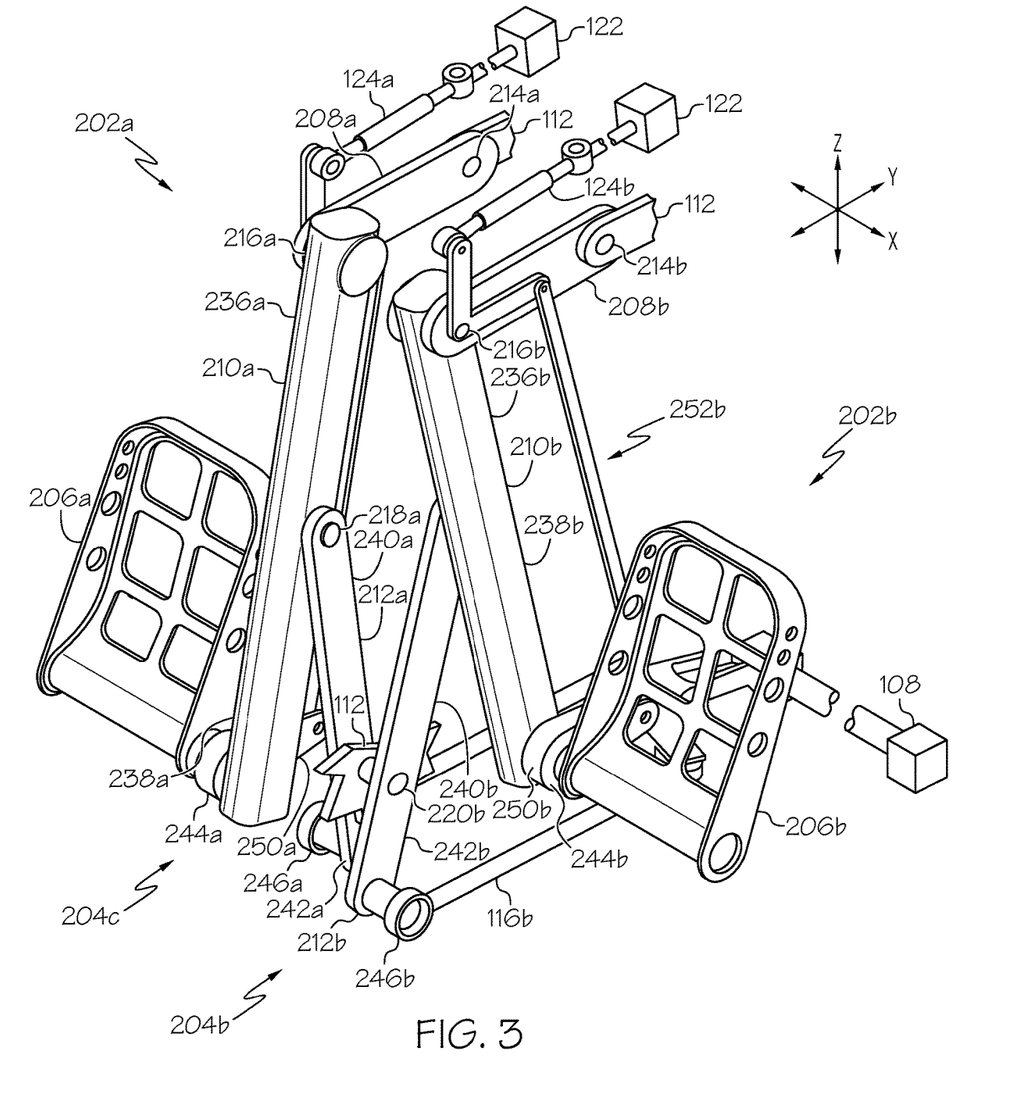
FIG. 3 is a schematic isometric view of the rudder control apparatus of FIG. 2 with a right one of the pedal assemblies in a forward position.
Figure 4:
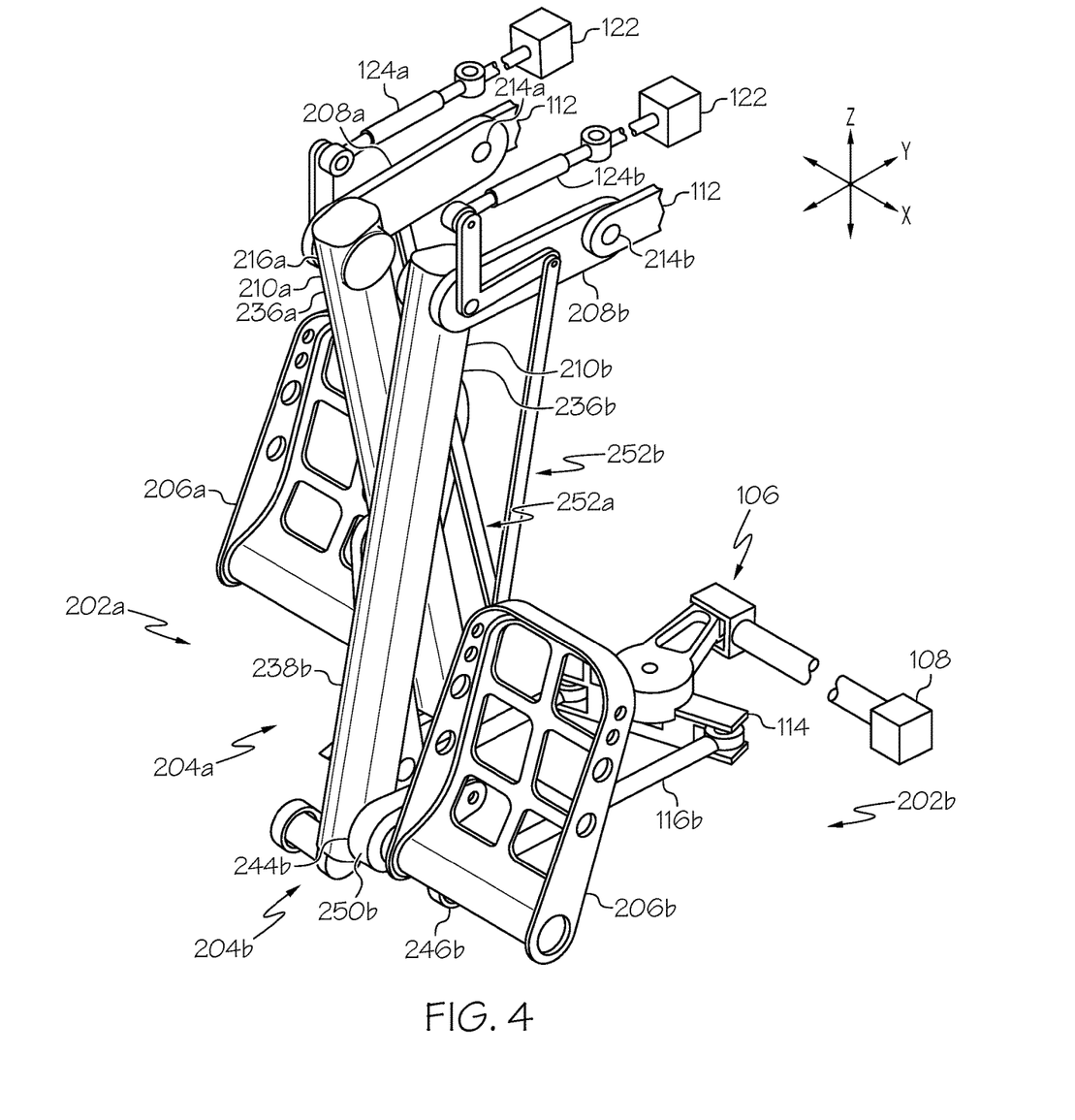
FIG. 4 is a schematic isometric view of the rudder control apparatus of FIG. 2 with a left one of the pedal assemblies in the forward position.

Referring to FIGS. 2-4, one example of rudder control apparatus 200, hereinafter referred to generally as apparatus 200, is disclosed. Apparatus 200 includes a laterally spaced apart pair of pedal assemblies 202. Each one of pedal assemblies 202 may be coupled to support frame 112 and to rudder control device 106. Each one (e.g., a first one or left one and a second one or right one) of pedal assemblies 202 may be also identified individually in FIGS. 3 and 4 as left pedal assembly 202a and right pedal assembly 202b. Each one of pedal assemblies 202 may include four-bar linkage 204. Each one (e.g., a first one or a left one and a second one or a right one) of four-bar linkages may also be identified individually in FIGS. 3 and 4 as left four-bar linkage 204a and right four-bar linkage 204b. Each one of four-bar linkages 204 may be constrained to movement in an approximately vertical plane (e.g., a plane approximately parallel to a Y, Z-plane formed by a Y-axis and a Z-axis) (FIG. 2). Each one of pedal assemblies 202 may include pedal 206 coupled to four-bar linkage 204. Each one (e.g., a first one or a left one and a second one or a right one) of pedals 206 may also be identified individually in FIGS. 3 and 4 as left pedal 206a and right pedal 206b. Each one of pedals 206 may be constrained to movement in an approximately horizontal plane (e.g., a plane approximately parallel to an X, Y-plane formed by an X-axis and the Y-axis) (FIG. 2).

Each one of pedal assemblies 202 may be interconnected, for example, by rudder bar 114 pivoted at its center, so that when one of pedals 206 moves in a forward direction (e.g., is pushed away from the pilot) the other one of pedals 206 moves in an aft direction (e.g., toward the pilot). Rudder bar 114 may be connected to or may form a part of rudder control device 106. FIG. 2 illustrates each one of pedal assemblies 202 in a neutral position. FIG. 3 illustrates the right one of pedal assemblies 202 (e.g., right pedal assembly 202b) in a forward position (e.g., right pedal 206b moved away from the pilot) and the left one of pedal assemblies 202 (e.g., left pedal assembly 202a) in an aft position (e.g., left pedal 206a moved toward the pilot). FIG. 4 illustrates the left one of pedal assemblies 202 (e.g., left pedal assembly 202a) in the forward position (e.g., left pedal 206a moved away from the pilot) and a right one of pedal assemblies 202 (e.g., right pedal assembly 202b) in the aft position (e.g., right pedal 206b moved toward the pilot).

Referring to FIGS. 2-4, in one example, each one of four-bar linkages 204 includes idler link 208. Each one (e.g., a first one or a left one and a second one or a right one) of idler links 208 may also be identified individually in FIGS. 3 and 4 as left idler link 208a and right idler link 208b. Each one of idler links 208 is pivotably coupled to support frame 112 by first joint 214. Each one (e.g., a first one or a left one and a second one or a right one) of first joints 214 may also be identified individually in FIGS. 3 and 4 as left first joint 214a and right first joint 214b.

Each one of four-bar linkages 204 includes coupler link 210. Each one (e.g., a first one or a left one and a second one or a right one) of coupler links 210 may also be identified individually in FIGS. 3 and 4 as left coupler link 210a and right coupler link 210b. Each one of coupler links 210 is pivotably coupled to idler link 208 at second joint 216. Each one (e.g., a first one or a left one and a second one or a right one) of second joints 216 may also be identified individually in FIGS. 3 and 4 as left second joint 216a and right second joint 216b.

Each one of four-bar linkages 204 includes drive link 212. Each one (e.g., a first one or a left one and a second one or a right one) of drive links 212 may also be identified individually in FIGS. 3 and 4 as left drive link 212a and right drive link 212b. Each one of drive links 212 is pivotably coupled to coupler link 210 at third joint 218 and pivotably coupled to support frame 112 at fourth joint 220. Each one (e.g., a first one or a left one and a second one or a right one) of third joints 218 may also be identified individually in FIGS. 3 and 4 as left third joint 218a and right third joint 218b. Each one (e.g., a first one or a left one and a second one or a right one) of fourth joints 220 may also be identified individually in FIGS. 3 and 4 as left fourth joint 220a and right fourth joint 220b.

Figure 5:
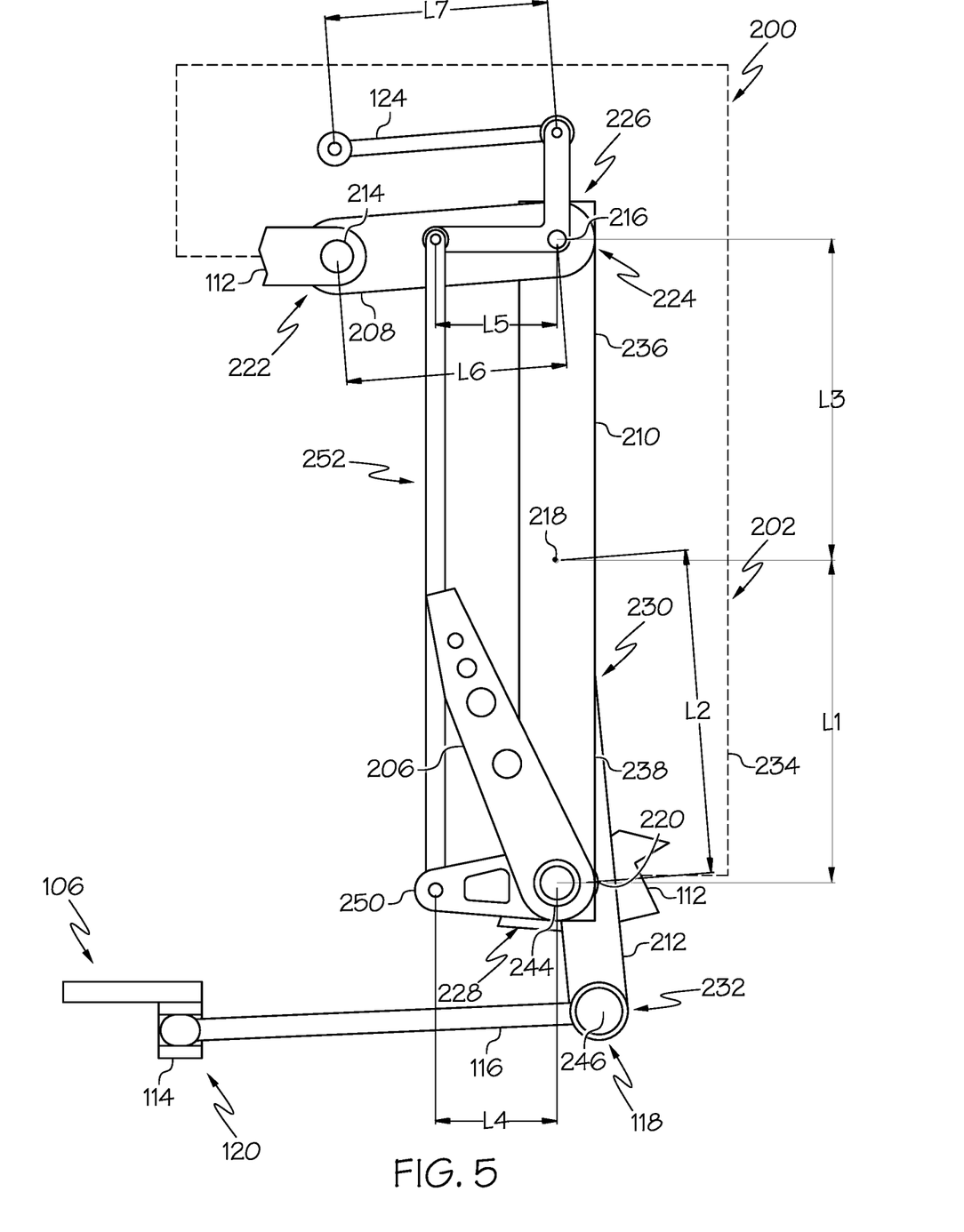
FIG. 5 is a schematic side elevation view of one example of the disclosed rudder control apparatus.

Referring to FIG. 5, and with reference to FIGS. 1-4, support frame 112 forms an imaginary fixed (e.g., ground) link 234 to complete each one of four-bar linkages 204. Thus, idler link 208, coupler link 210, and drive link 212 combine with fixed link 234 formed by support frame 112 between first joint 214 and fourth joint 220 (FIGS. 2-4) to create four-bar linkage 204. As one example, support frame 112 may include (e.g., be formed by) a portion of an airframe of aircraft 100 (FIG. 1). As another example, support frame 112 may include (e.g., be formed by) a structural portion of cockpit 102 (FIG. 1).

Referring to FIG. 5, and with reference to FIGS. 2-4, each one of idler links 208 includes idler link-first end 222 and idler link-second end 224 opposite idler link-first end 222. Each one of coupler links 210 includes coupler link-first end 226 and couple link-second end 228 opposite coupler link-first end 226. Each one of drive links 212 includes drive link-first end 230 and drive link-second end 232 opposite drive link-first end 230.

Idler link-first end 222 is pivotably coupled to support frame 112 (forming first joint 214). Coupler link-first end 226 is pivotably coupled to idler link-second end 224 (forming second joint 216). Drive link-first end 230 is pivotably coupled to an intermediate location of coupler link 210 spaced away from and disposed between coupler link-first end 226 and coupler-link-second end 228 (forming third joint 218). Drive link 212 is pivotably coupled to support frame 112 at an intermediate location spaced away from and disposed between drive link-first end 230 and drive link-second end 232.

In one example, each one of coupler links 210 includes coupler link-connection portion 236 and coupler link-extension portion 238. Coupler link-connection portion 236 may be formed (e.g., defined by a portion of coupler link 210) between coupler link-first end 226 and third joint 218 (the location of the pivot connection between coupler link 210 and drive link-first end 230). Coupler link-extension portion 238 may be formed (e.g., defined by another portion of coupler link 210) between third joint 218 and coupler link-second end 228. Each one (e.g., a first one or left one and a second one or right one) of coupler link-connection portions 236 may also be identified in FIGS. 3 and 4 as left coupler link-connection portion 236a and right coupler link-connection portion 236b. Each one (e.g., a first one or left one and a second one or right one) of coupler link-extension portions 238 may also be identified in FIGS. 3 and 4 as left coupler link-extension portion 238a and right coupler link-extension portion 238b.

In one example, each one of drive links 212 includes drive link-connection portion 240 and drive link-extension portion 242 (FIG. 2). Drive link-connection portion 240 may be formed (e.g., defined by a portion of drive link 212) between drive link-first end 230 and fourth joint 220 (the location of the pivot connection between drive link 212 and support frame 112). Drive link-extension portion 242 may be formed (e.g., defined by another portion of drive link 212) between fourth joint 220 and drive link-second end 232. Each one (e.g., a first one or left one and a second one or right one) of drive link-connection portions 240 may also be identified in FIGS. 3 and 4 as left drive link-connection portion 240a and right drive link-connection portion 240b. Each one (e.g., a first one or left one and a second one or right one) of drive link-extension portions 242 may also be identified in FIGS. 3 and 4 as left drive link-extension portion 242a and right drive link-extension portion 242b.

Each one of pedals 206 is coupled to coupler link-second end 228 of a corresponding one of coupler links 210. As one example, pedal 206 is coupled to coupler link 210 at fifth joint 244 proximate (e.g., at or near) coupler link-second end 228. Pedal 206 may be pivotably coupled to coupler link 210 at fifth joint 244. Each one (e.g., a first one or a left one and a second one or a right one) of fifth joints 244 may also be identified individually in FIGS. 3 and 4 as left fifth joint 244a and right fifth joint 244b.

Drive link-second end 232 of each one of drive links 212 is operatively coupled to rudder control device 106. In such a configuration, forward motion of one of pedals 206 is translated to or is otherwise detected by rudder control device 106 via a forward stroke of an associated one of pedal assemblies 202 and corresponding motion of an associated one of four-bar linkages 204. As one example, forward motion of pedal 206 along approximately linear travel path 248 (FIGS. 6A, 6B and 6C) is translated, via four-bar-linkage 204, to rearward (e.g., aft) motion of drive link-second end 232 in order to affect a control operation of rudder control device 106.

As one example, rudder control device 106 may include rudder control pushrod 116. Each one of rudder control pushrods 116 is coupled to a corresponding one of drive links 212 and a corresponding end of rudder bar 114. Each one (e.g., a first one or left one and a second one or right one) of rudder control pushrods 116 may also be identified individually in FIGS. 3 and 4 as left rudder control pushrod 116a and right rudder control pushrod 116b. Each one of rudder control pushrods 116 may include rudder control pushrod-first end 118 and rudder control pushrod-second end 120. Rudder control pushrod 116 (e.g., proximate rudder control pushrod-first end 118) may be pivotably coupled to drive link 212 at sixth joint 246 (e.g., proximate drive link-second end 232). Each one (e.g., a first one or a left one and a second one or a right one) of sixth joints 246 may also be identified individually in FIGS. 3 and 4 as left sixth joint 246a and right sixth joint 246b. Rudder control pushrod 116 (e.g., proximate actuation rod-second end 120) may be coupled to the corresponding end of rudder bar 114.

In one example, and as illustrated in FIG. 3, the forward stroke of right four-bar linkage 204b in response to forward motion of right pedal 206b (and an opposing rearward stroke of left four-bar linkage 204a) may actuate (e.g., move or pivot) rudder bar 114, which in turn causes side-to-side movement of rudder 108 (FIG. 1) in a first direction. Similarly, and as illustrated in FIG. 4, the forward stroke of left four-bar linkage 204a in response to forward motion of left pedal 206a (and the opposing rearward stroke of right four-bar linkage 204b) may actuate rudder bar 114, which in turn causes an opposing side-to-side movement of rudder 108 (FIG. 1) in a second direction.

Figure 6A:
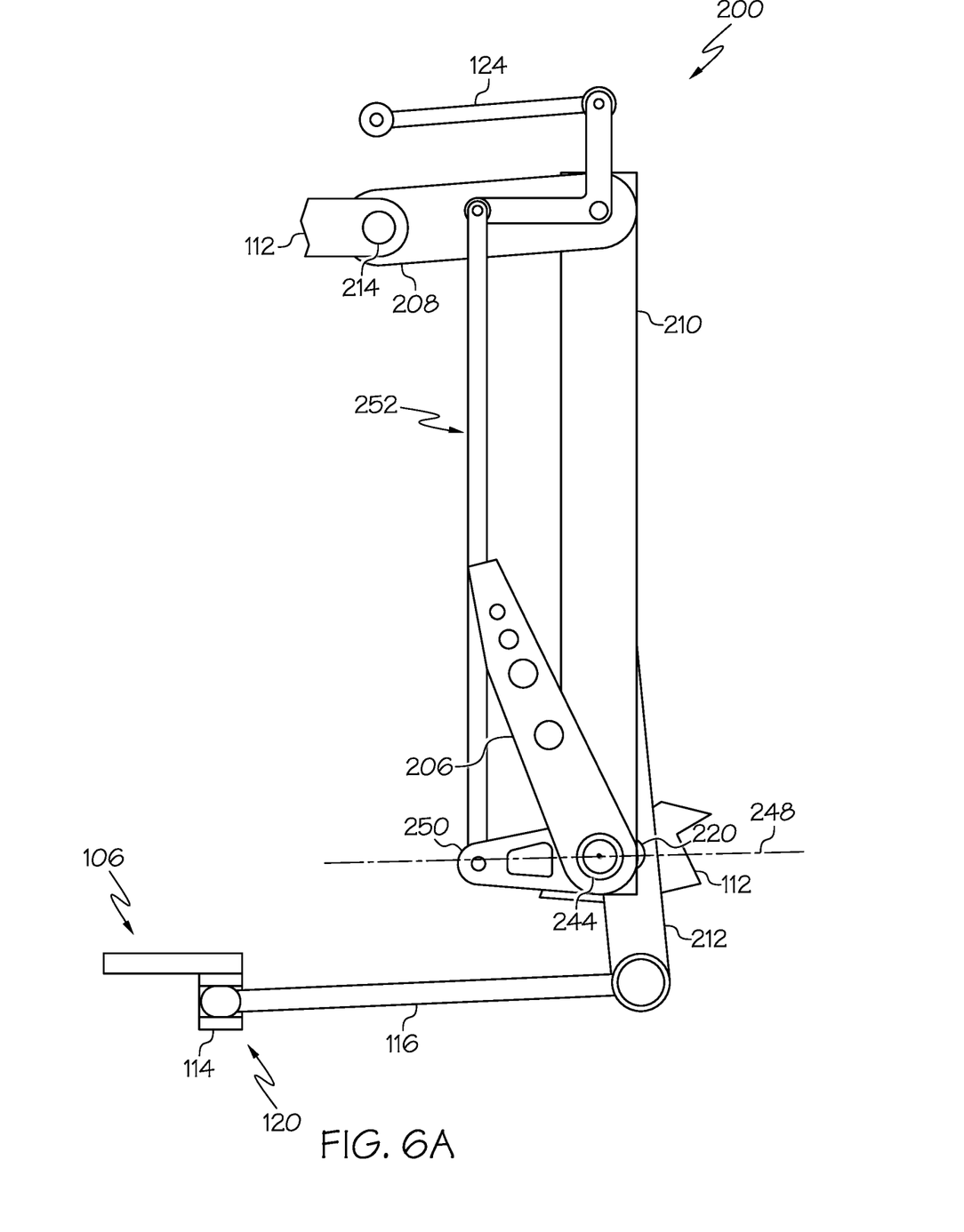
FIG. 6A is a schematic side elevation view of one example of the disclosed rudder control apparatus with the pedal assemblies in the neutral position and illustrating an approximately linear travel path of the pedals.
Figure 6B:
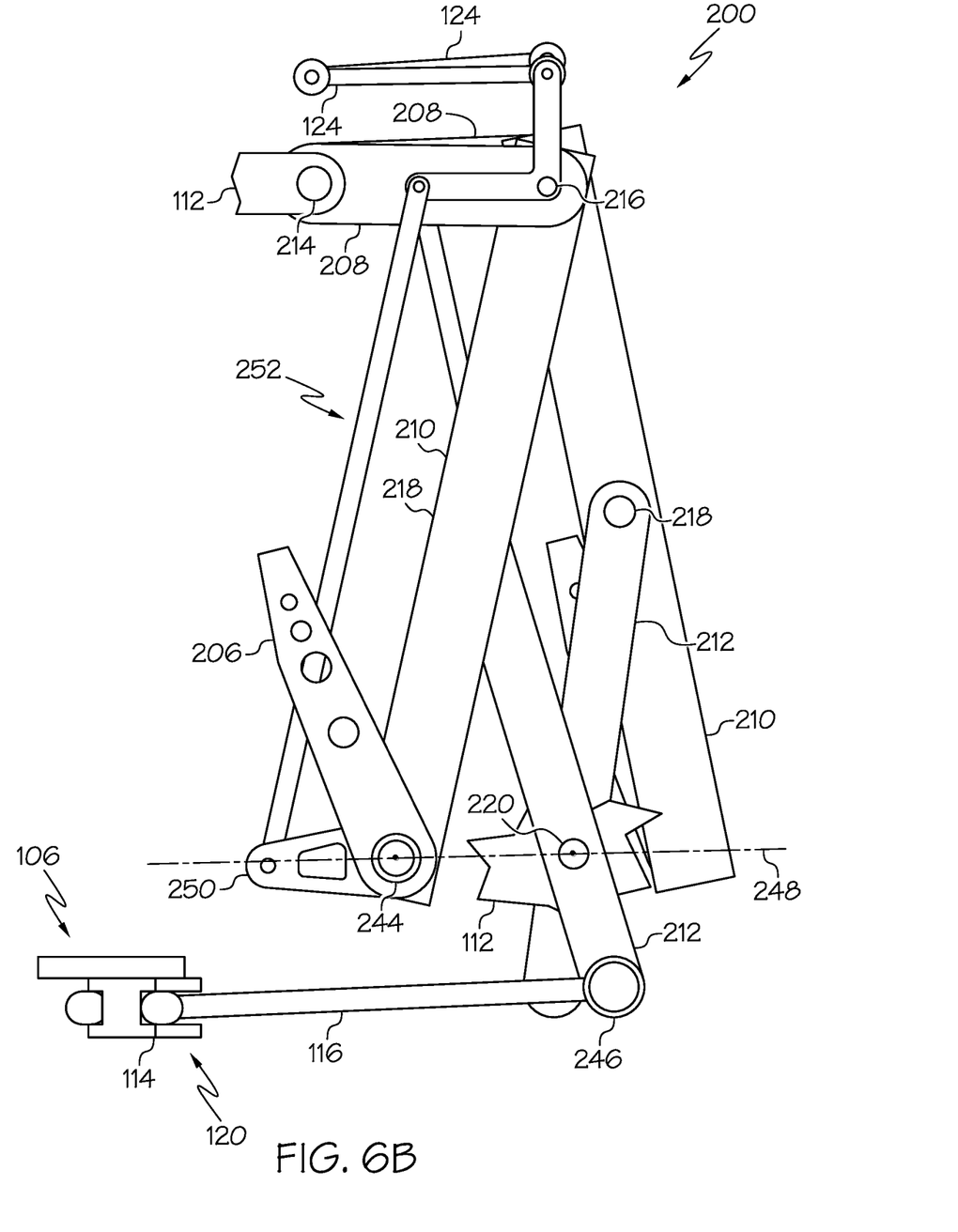
FIG. 6B is a schematic side elevation view of the disclosed rudder control apparatus of FIG. 6A with the left one of the pedal assemblies in the forward position and illustrating the approximately linear travel path of the pedals.
Figure 6C:
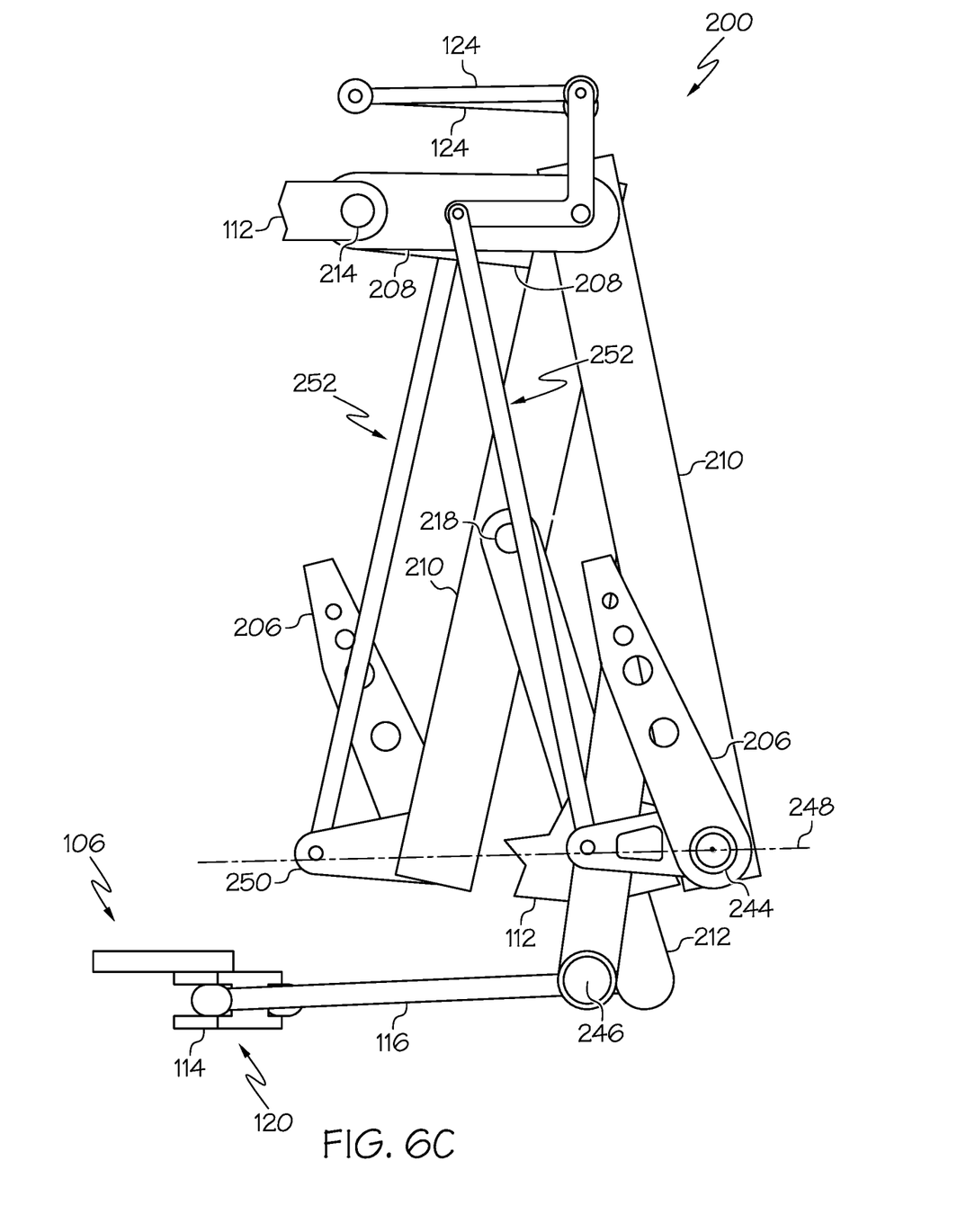
FIG. 6C is a schematic side elevation view of the disclosed rudder control apparatus of FIG. 6A with the right one of the pedal assemblies in the forward position and illustrating the approximately linear travel path of the pedals.

Referring to FIGS. 6A, 6B and 6C, the stroke (e.g., the forward stroke and rearward stroke) of each one of four-bar linkages 204 provides for forward and rearward movement of pedal 206 along a predefined travel path 248. Each one of four-bar linkages 204 is constructed such that travel path 248 is approximately linear (e.g., approximately linear travel path 248). As one example, linear travel path 248 may be approximately parallel to the horizontal plane. As another example, linear travel path 248 may be disposed at an angle of at most approximately five degrees relative to the horizontal plane. As another example, linear travel path 248 may be disposed at an angle of at most approximately ten degrees relative to the horizontal plane. As yet another example, linear travel path 248 may be disposed at an angle of at most approximately fifteen degrees relative to the horizontal plane.

In order to provide for the approximately linear travel path 248, various lengths of portions of the links between certain ones of the joints of four-bar linkage 204 may be set to predefined ratios. In one example, a first ratio of length L1 of a portion of coupler link 210 between third joint 218 and fifth joint 244 and length L2 of a portion of drive link 212 between third joint and fourth joint 220 are configured to provide approximately linear travel path 248 for pedal 206. As one example, coupler link-extension portion 236 may define length L1 and drive link-connection portion 240 may define length L2.

In one example, a second ratio of length L1 of the portion of coupler link 210 between third joint 218 and fifth joint 244 and length L3 of another portion of coupler link 210 between second joint 216 and third joint are configured to provide approximately linear travel path 248 for pedal 206.

As one example, coupler link-extension portion 236 may define length L1 and coupler link-connection portion 236 may define length L3.

In one example, the first ratio of length L1 to length L2 may be approximately one to one (1:1). In other words, length L1 to length L2 may be approximately equal. However, in other examples, the first ratio of length L1 to length L2 may vary by a few percent to several percent. As one example, length L1 and length L2 may within approximately two-and-a-half percent of each other (e.g., length L1 may be up to approximately two-and-a-half percent greater or less than length L2). As another example, length L1 and length L2 may within approximately five percent of each other.

In one example, the first ratio of length L1 to length L3 may be approximately one to one (1:1). In other words, length L1 to length L3 may be approximately equal. However, in other examples, the first ratio of length L1 to length L3 may vary by a few percent to several percent. As one example, length L1 and length L3 may be within approximately two-and-a-half percent of each other (e.g., length L1 may be up to approximately two-and-a-half percent greater or less than length L3). As another example, length L1 and length L2 may within approximately five percent of each other.

FIGS. 6A, 6B and 6C illustrate approximately linear travel path 248 of each one of pedals 206 during the forward and rearward stroke of each one of four-bar linkages 204 of pedal assemblies 202. FIG. 6A illustrates apparatus 200 with the left one of pedal assemblies 202 (e.g., left pedal assembly 202a in FIGS. 3 and 4) and the right one of pedal assemblies 202 (e.g., right pedal assembly 202b in FIGS. 3 and 4) in the neutral position. FIG. 6B illustrates apparatus 200 with the left one of pedal assemblies 202 in the forward position and the right one of pedal assemblies 202 in the rearward position. FIG. 6C illustrates apparatus 200 with the right one of pedal assemblies 202 in the forward position and the left one of pedal assemblies 202 in the rearward position.

Referring to FIGS. 6A, 6B and 6C, and with reference to FIGS. 2-4, in response to a forward force applied one of pedals 206, the one of pedals 206 moves forward along approximately linear travel path 248 and the other one of pedals 206 moves rearward along approximately linear travel path 248. In other words, in response to the forward force applied pedal 206, fifth joint 244 moves (e.g., forward and rearward) along approximately linear travel path 248.

Referring to FIGS. 6A, 6B and 6C, in one example implementation, both pedal assemblies 202 may begin in the neutral position, as illustrated in FIG. 6A. In order to cause side-to-side movement of rudder 108 (FIG. 1), the pilot may apply a forward force to one of pedals 206 and initiate the forward stroke of the associated one of four-bar linkages 204, which in turn moves pedal 206 along approximately linear travel path 248. As described above, since both pedal assemblies 202 are interconnected through rudder control device 106, the forward stroke of one of four-bar linkages 204 may in turn cause the rearward stroke of the other one of four-bar linkages 204 and rearward movement of the other one of pedals 206, as illustrated in FIGS. 6B and 6C.

In one example, during the forward stroke of four-bar linkage 204 (e.g., of pedal assembly 202), fifth joint 244 and, thus, pedal 206 moves along linear travel path 248. Forward movement of pedal 206 (and fifth joint 244) causes coupler link 210 to pivot about second joint 216 and idler link 208 to pivot about first joint 214. Pivot motion of coupler link 210 about second joint 216 moves third joint 218 forward, causes drive link 212 to pivot about left third joint 218a and fourth joint 220, and moves sixth joint 246 rearward. Rearward movement of sixth joint 246 is translated to pivot motion of rudder bar 114 via a rearward force applied by rudder control pushrod 116. During the rearward stroke of four-bar linkage 204 (e.g., of pedal assembly 202), the motions described above are substantially reversed due to a forward force being applied to sixth joint 246 by rudder control pushrod 116.

In addition to the first and second length ratios described above, idler link 208 also provides for approximately linear travel path 248 of pedal 206. Idler link 208 constrains movement of fifth joint 244 along approximately linear travel path 248 by facilitating approximately vertical (e.g., up and down) movement of second joint 216 as coupler link 210 pivots about second joint 216 and second joint 216 pivots about first joint 214. First joint 214 and fourth joint 220 remain in a fixed position by support frame 112 throughout the forward and rearward stroke of pedal assembly 202.

Referring to FIGS. 2-6, and with reference to FIG. 1, in one example, each one of pedal assemblies 202 may also provide for control for brake system 122 of aircraft 100. In one example, pedal 206 may be pivotably coupled to coupler link 210 at fifth joint 244 (proximate coupler link-second end 228). In such a configuration, pivot motion of pedal 206 about fifth joint 244 may actuate brake system 122. Each one of pedals 206 may operate independently such that the pilot may apply asymmetric brake pressure to brake system 122.

In one example, each one of pedal assemblies 202 includes pedal crank 250. Each one (e.g., a first one or left one and a second one or right one) of pedal cranks 250 may be individually identified in FIGS. 3 and 4 as left pedal crank 250a and right pedal crank 250b. Pedal crank 250 may be pivotably coupled to coupler link 210 at fifth joint 244 (e.g., proximate coupler link-second end 228). Pedal 206 may be fixedly coupled to pedal crank 250 such that a force applied to an upper portion of pedal 206 (e.g., spaced away from fifth joint 244) by the pilot's foot is translated to rotation of pedal crank 250 about fifth joint 244. In other words, the rotational force applied to the upper portion of pedal 206 (e.g., away from fifth joint 244) that in turn rotates pedal 206 (or pedal crank 250) about fifth joint 244 to affect brake control is separate and distinct from the forward force applied to pedal 206 (e.g., proximate fifth joint 244) that in turn moves pedal 206 forward and actuates four-bar linkage 204 to affect rudder control. Each one of pedal assemblies 202 may include brake control linkage 252. Each one (e.g., a first one or a left one and a second one or a right one) of brake control linkages 252 may also be identified in FIGS. 3 and 4 as left brake linkage 252a and right brake linkage 252b. Each one of brake control linkages 252 may include two or more brake control links (not explicitly identified). One end of brake control linkage 252 is pivotably coupled to pedal crank 250, for example, proximate an end thereof (e.g., an end opposite fifth joint 244). An opposing end of brake control linkage 252 is pivotably coupled to an end of brake control pushrod 124. Each one (e.g., a first one or a left one and a second one or a right one) of brake control pushrod 124 may also be identified in FIGS. 3 and 4 as left brake control pushrod 124a and right brake control pushrod 124b. An opposing end of brake control pushrod 124 may be operative coupled to brake system 122. Thus, rotation of pedal 206 (and pedal crank 250) about fifth joint 244 may be direction proportional to the brake pressure applied to brake system 122.

In one example, the disclosed apparatus 200 may facilitate position adjustment of pedal 206 of each pedal assembly 202. As one example, the position of pedal 206 in the neutral position, as illustrated in FIGS. 2 and 5, may be adjusted forward or aft, for example, relative to the pilot to accommodate for pilots of different sizes. As one example, the relative location of fourth joint 220 (e.g., the location of the pivot connection between drive link 212 and support frame 112) may be moved forward or aft. Adjustment of the relative location of fourth joint 220 may effectuate a change in the forward/aft position of pedal 206 relative to the pilot.

Accordingly, the disclosed rudder control apparatus 200 and rudder control pedal assembly 202 provide for approximately linear travel path 248 of the pilot's feet when used to control motion of rudder 108, which is an ergonomically superior design compared to an arcuate travel path.

Figure 7:
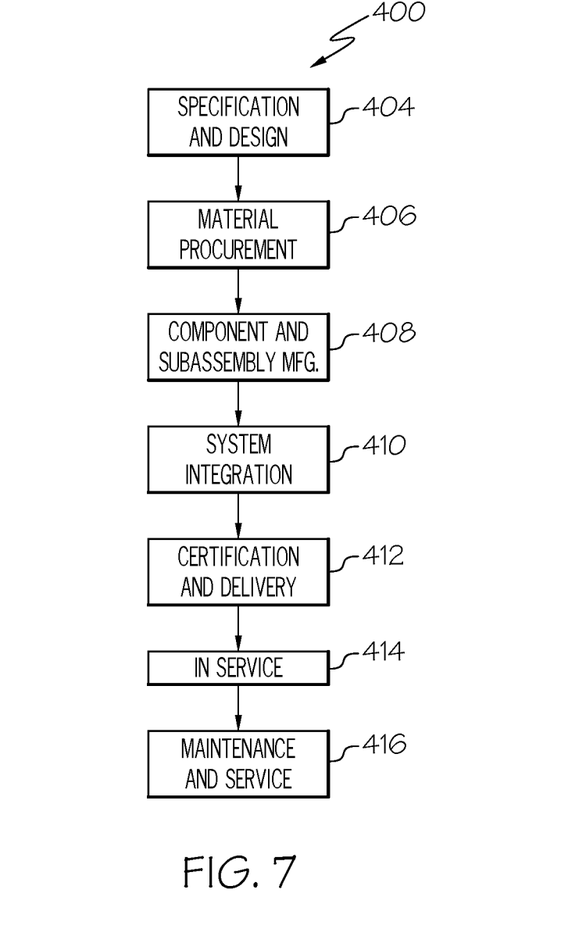
FIG. 7 is flow diagram of an aircraft manufacturing and service methodology.
Figure 8:
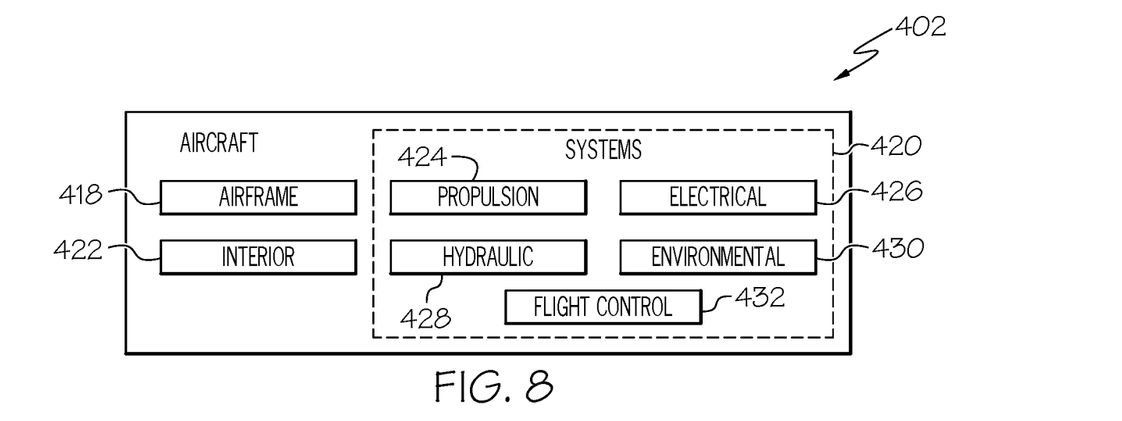
FIG. 8 is a block diagram of an aircraft.

Examples of the disclosure may be described in the context of an aircraft manufacturing and service method 400, as shown in FIG. 7, and an aircraft 402, as shown in FIG. 8. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, an environmental system 430, and a flight control system 432. The disclosed rudder control pedal assembly with linear pedal travel path 200 may be included in or form a part of the flight control system 432. Any number of other systems may be included.

The disclosed rudder control pedal assembly with linear pedal travel path may be employed during any one or more of the stages of the aircraft manufacturing and service method 400. As one example, the disclosed rudder control pedal assembly with linear pedal travel path may be employed during material procurement 406. As another example, components or subassemblies corresponding to component/subassembly manufacturing 408, system integration 410, and or maintenance and service 416 may be fabricated or manufactured using the disclosed rudder control pedal assembly with linear pedal travel path. As another example, the airframe 418 and the interior 422 may be constructed using the disclosed rudder control pedal assembly with linear pedal travel path. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed rudder control pedal assembly with linear pedal travel path is described in the context of an aircraft; however, one of ordinary skill in the art will readily recognize that the disclosed rudder control pedal assembly with linear pedal travel path may be utilized for a variety of applications. For example, the disclosed rudder control pedal assembly with linear pedal travel path may be implemented in various types of vehicles including, e.g., helicopters, passenger ships, automobiles, construction equipment, farm equipment, tracked vehicles and the like.

Although various embodiments of the disclosed rudder control pedal assembly with linear pedal travel path have been shown and described, modifications may occur to those skilled in the art upon reading the specification. The present application includes such modifications and is limited only by the scope of the claims.

What is claimed is:

1. A rudder control pedal assembly comprising:
an idler link pivotably coupled to a support frame at a first joint;
a coupler link pivotably coupled to said idler link at a second joint;
a drive link pivotably coupled to said coupler link at a third joint and pivotably coupled to said support frame at a fourth joint; and
a pedal coupled to said coupler link and constrained to movement along an approximately linear travel path,
wherein said support frame forms an imaginary fixed link to complete a four-bar linkage.

2. The rudder control pedal assembly of claim 1 wherein:
said coupler link comprises a coupler link-first end and a coupler link-second end opposite said coupler link-first end,
said third joint is spaced away from said coupler link-second end, and
said pedal is coupled to said coupler link-second end at a fifth joint.

3. The rudder control pedal assembly of claim 2 wherein a first ratio of a length L1 of said coupler link between said third joint and said fifth joint and a length L2 of said drive link between said third joint and said fourth joint are configured to provide said approximately linear travel path for said pedal.

4. The rudder control pedal assembly of claim 3 wherein said first ratio is approximately 1:1.

5. The rudder control pedal assembly of claim 3 wherein a second ratio of said length L1 and a length L3 of said coupler link between said second joint and said third joint are configured to provide said approximately linear travel path for said pedal.

6. The rudder control pedal assembly of claim 5 wherein said second ratio is approximately 1:1.

7. The rudder control pedal assembly of claim 5 wherein said first ratio is approximately 1:1, and wherein said second ratio is approximately 1:1.

8. The rudder control pedal assembly of claim 2 wherein a ratio of a length L1 of said coupler link between said third joint and said fifth joint and a length L3 of said coupler link between said second joint and said third joint is 1:1.

9. The rudder control pedal assembly of claim 2 wherein:
said pedal is pivotable relative to said coupler link about said fifth joint and is further coupled to a brake system; and
pivotal movement of said pedal relative to said coupler link about said fifth joint operates said brake system.

10. The rudder control pedal assembly of claim 1 wherein said approximately linear travel path is parallel to a horizontal plane.

11. The rudder control pedal assembly of claim 1 wherein said approximately linear travel path is disposed at an angle of at most 10 degrees relative to a horizontal plane.

12. The rudder control pedal assembly of claim 1 wherein a location of said fourth joint relative to said support frame is adjustable.

13. The rudder control pedal assembly of claim 1 wherein said second joint partially revolves around said first joint in response to pivotal movement of said idler link relative to said support frame about said first joint.

14. The rudder control pedal assembly of claim 13 wherein said third joint partially revolves around said second joint in response to pivotal movement of said coupler link relative to said idler link about said second joint.

15. The rudder control pedal assembly of claim 14 wherein said third joint is located between said second joint and said fifth joint.

16. The rudder control pedal assembly of claim 15 wherein:
    said coupler link comprises a coupler link-first end and a coupler link-second end, opposite to said coupler link-first end;
    said second joint is located at said coupler link-first end;
    said fifth joint is located at said coupler link-second end; and
    said third joint is located at an intermediate location between said coupler link-first end and said coupler link-second end.

17. The rudder control pedal assembly of claim 1 operatively connected to a rudder.

18. The rudder control pedal assembly of claim 17 wherein the rudder is associated with an empennage of an aircraft.

19. A vehicle comprising the rudder control pedal assembly of claim 1.

20. An aircraft comprising the rudder control pedal assembly of claim 1.

\* \* \* \* \*